C. LE G. FORTESCUE.
BALANCING MEANS FOR POLYPHASE SYSTEMS.
APPLICATION FILED AUG. 4, 1916.

1,376,417.

Patented May 3, 1921.
2 SHEETS—SHEET 1.

WITNESSES:

INVENTOR
Charles LeG. Fortescue
BY
ATTORNEY

C. LE G. FORTESCUE.
BALANCING MEANS FOR POLYPHASE SYSTEMS.
APPLICATION FILED AUG. 4, 1916.

1,376,417.

Patented May 3, 1921.
2 SHEETS—SHEET 2.

WITNESSES:

INVENTOR
Charles Le G. Fortescue.
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

BALANCING MEANS FOR POLYPHASE SYSTEMS.

1,376,417.   Specification of Letters Patent.   Patented May 3, 1921.

Application filed August 4, 1916. Serial No. 113,101.

*To all whom it may concern:*

Be it known that I, CHARLES LE G. FORTESCUE, a subject of the King of England, and a resident of Pittsburgh, in the county of Allegheny and State of Pennsylvania, have invented a new and useful Improvement in Balancing Means for Polyphase Systems, of which the following is a specification.

My invention relates to balancing means for polyphase systems, and it has for its object to provide apparatus of the character designated that shall be simple and economical in construction and highly effective in operation.

Figure 1:
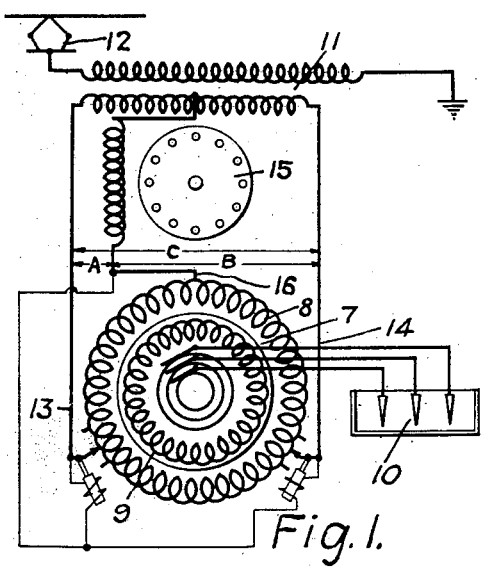
Figure 2:
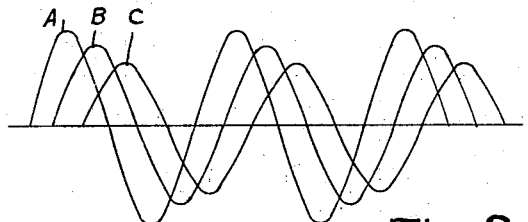
Figure 3:
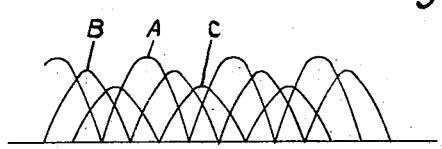
Figure 4:
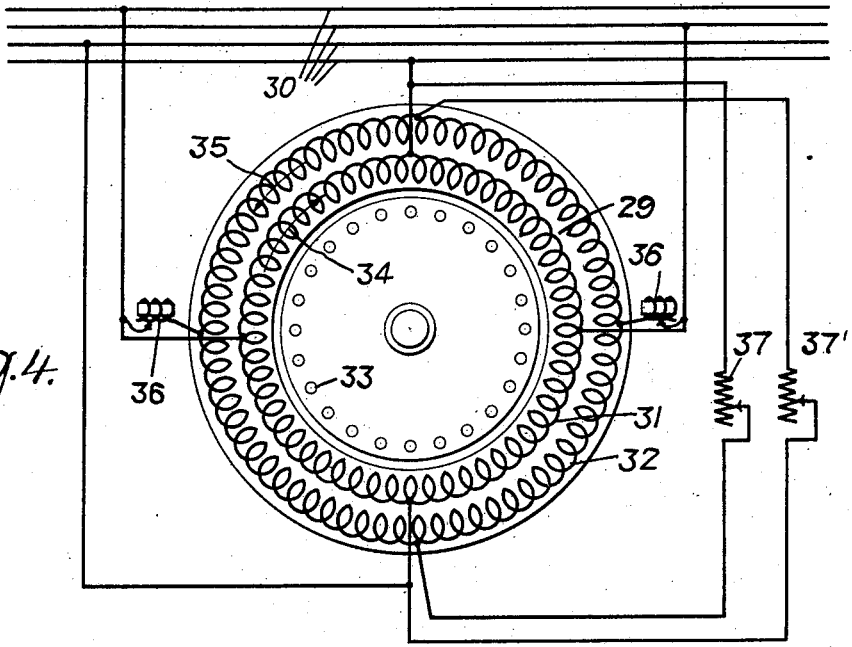
Figure 5:
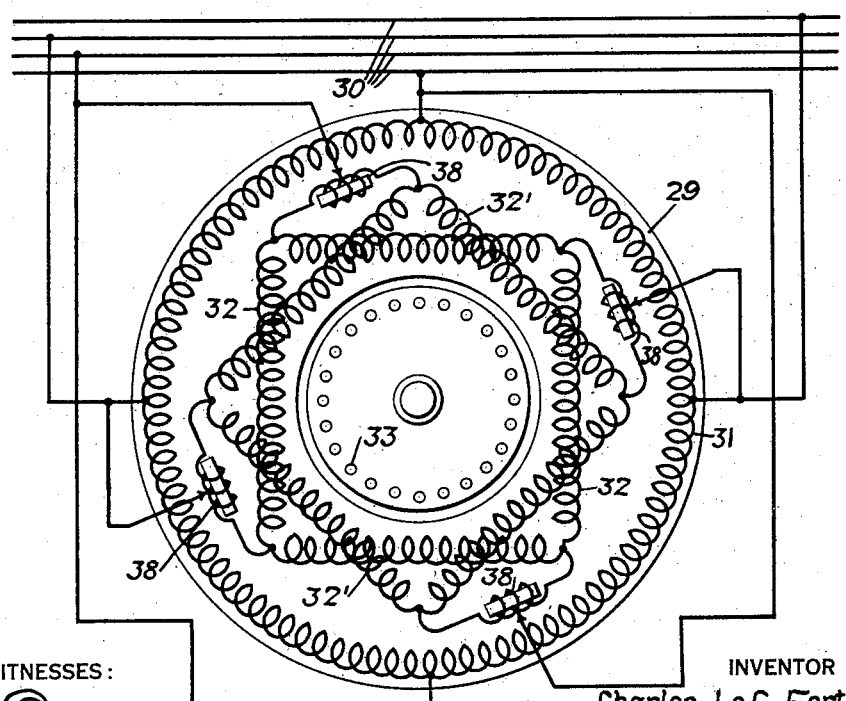

In the accompanying drawing, Figure 1 is a diagrammatic view of a polyphase system of distribution subject to unbalancing, together with balancing means constructed in accordance with my invention applied thereto; Figs. 2 and 3 are wave diagrams of the voltage, current and energy in an unbalanced polyphase system to be employed in the explanation of my invention; and Figs. 4 and 5 are diagrammatic views of modified forms of apparatus embodying my invention.

It is well known that a polyphase motor, particularly of the induction type, exerts a pronounced balancing action upon its supply system if said system is unbalanced. From one view point, this action may be explained as follows: Assuming the motor to be driven at a substantially constant load and, therefore, operating at a definite average speed, there is a momentary tendency to operate at a higher speed than the average during the preponderance of a major phase in the supply system and a tendency to fall below the average speed during the preponderance of a minor phase. During said abnormal acceleration, under the action of the major phase, the motor is deriving more energy from the system than is demanded by the load and storing said energy in the form of momentum in the rotor. When, on the other hand, the motor is slowing down during the predominance of a minor phase, there is a temporary generator action, and kinetic energy from the rotor is transformed into electrical energy and supplied to the deficient phase. Obviously, in this manner, by the absorption of energy from the major phases, by the temporary storage of said energy and by its redelivery to the minor phases, a desirable balancing action is produced.

From another viewpoint, the balancing action may be explained by considering the electromotive forces of the supply system as unequal in value, whereas the back electromotive forces of the substantially constant-speed motor are equal in value. The resultant electromotive force, tending to force current through the motor, is therefore much greater during a major phase than during a minor phase, resulting in the derivation of an undue proportion of the energy of the motor from the major phases, with a resultant balancing action.

In explaining my invention, attention is first directed to the well known fact that any stationary periodic function may be resolved into two oppositely-rotating periodic functions of like frequency but of half the amplitude, as explained, for example, on page 43 *et seq.* of Hays' "*Alternating Currents*" (1911 edition). With this method of analysis in mind, a polyphase motor, particularly of the induction type, when operating on an unbalanced or unsymmetrical system, may be considered in terms of two impedances, one of which is the normal impedance with respect to the positively rotating polyphase component, under the particular condition of operation, and the other impedance is that to the negatively rotating polyphase component. The former impedance is a function of the load delivered by the motor, as impedance is a function of frequency and the slip frequency increases with the load; whereas the latter impedance varies but slightly with the load on the motor, its frequency being determined by synchronous frequency minus the slip frequency. The latter impedance, or that due to the negatively rotating component, is the same as the impedance of the motor to a balanced rotating system when driven against its torque at synchronous speed, and the flow of current determined thereby determines the balancing power of the induction motor.

Obviously, the balancing power of a motor may thus be greatly improved by accentuating, in any desired manner, said negatively rotating component and, by my invention, I provide means whereby a negatively rotating polyphase magnetomotive force of proper phase relation to that in the system to be balanced is superposed upon the motor excitation.

Referring to Fig. 1 of the accompanying drawing for a more detailed understanding of my invention, I show an induction motor of the phase-wound rotor type at 7, said motor being provided with a primary winding 8 and with a secondary winding 9. The resistance of the secondary circuit may be varied by a suitable rheostat 10, in a well known manner, although I may use a squirrel-cage secondary member, if desired. Energy for the operation of the motor 7 is derived from a single-phase transformer 11, connected, for example, between a trolley 12 and ground, as is usual in alternating-current railway systems. A portion of the energy derived from the transformer 11 is supplied directly to the motor 7 through suitable leads 13 and 14 and the remainder of said energy is altered in phase by a rotary phase converter 15 of the induction type and supplied to the motor 7 through a suitable lead 16. As is well known, a split-phase supply system of the character designated becomes more or less unbalanced with varying degrees of load, owing to the ohmic and reactance drops in the phase-converter windings. The points of attachment of the leads 13 and 14 to the primary winding 8 of the induction motor 7 are therefore made adjustable, as shown, in order that the different phase sections thereof may be altered in relative magnitude. Thus, for example, if the voltage of the phase-division 13—16 designated as A, becomes abnormally large, as compared with that of the phase 16—14, designated as C, and with respect to that of the phase 13—14, designated as B, the voltages and currents in the different phases may be indicated as shown in Fig. 2, assuming unity power factor and assuming that such scales are chosen as to render the voltage curve coincident with the current curve. The corresponding watt curves are shown in Fig. 3 and it is apparent that each phase periodically predominates in supplying energy to the motor, provided the unbalance is not too great, but that the phase A, which may be termed the major phase, unduly predominates over the others, particularly over the phase C, which may be designated as the minor phase. In order to effect a balancing action upon the system, energy should be abstracted from the phase A and supplied to the phase C, thus rendering both of said phases of substantially the magnitude of the phase B. In order to perform this function in accordance with the first of the foregoing theories of operation, the motor effect of the machine 7 should be increased during a predominating period of the phase A, and a generator action should be developed in the machine 7 during predominating periods of the phase C. I attain this action by moving the point of connection of the lead 13 to the primary winding 8 in a clockwise direction. Under these conditions, less than a third of the primary winding 8 is connected in the major phase, more than a third thereof is connected in the minor phase C and substantially one-third thereof remains connected in the normal phase B. As a result of the inclusion of an unduly small proportion of the primary winding in the major phase, the motor torque developed thereby during a predominance of said phase is noticeably greater than is necessary to supply the load, and the rotor of the machine 7 jumps ahead, so to speak, storing the excess energy derived from the system in the form of momentum. During the succeeding predominating period of the minor phase C, the motor torque is abnormally decreased because of the unduly large proportion of the primary winding A associated with said minor phase and the motor 7, therefore, slows down and its kinetic energy is given up in the form of electrical energy and is supplied to the minor phase C, thus producing the desired balancing action.

If the amount of unbalance of the polyphase system shown may be accurately foretold, I may adjust the points of attachment of the leads 13 and 14 to accurately balance the system at such times as the tendency to unbalance is substantially the same as the average predetermined value but, if the amount of unbalance is variable, because of variable load, I may obviously provide suitable solenoids or other current-responsive means associated with the different leads and operating, either cumulatively or differentially, to automatically adjust the points of attachment of the leads 13 and 14 so that approximate balance is obtained in the system under any and all conditions of unbalance.

I have shown my balancing means as applied to the motor in the system shown but I may, if desired, apply the same directly to the phase converter 15, thus curing the phase unbalancing at its source.

Referring now to Fig. 4, a quarter-phase induction motor 39 is shown connected to an unbalanced quarter-phase supply system 30. Said motor is provided with a main primary winding 31, an auxiliary primary winding 32 and a squirrel-cage secondary winding 33. The main primary winding 31 is connected to the supply system 30 so that the rotating field produced thereby rotates, for example, in a clockwise direction, as indicated by an arrow 34. The auxiliary primary winding 32 is also connected to be energized from the supply circuit 30 but the connections to the upper and lower points thereof are reversed with respect to the connections of the upper and lower points of the main primary winding 31 so that the rotating magnetic field of said auxiliary primary winding 32 revolves in the opposite direction, that is to say, in a counter-clockwise direction, as indicated by an arrow 35. The connections to the auxiliary primary winding 32 are made through adjustable reactance devices 36—36 and adjustable resistors 37—37, as shown, so that the field produced thereby is elliptical in nature and so that the phase of the major and minor axes of said elliptical field may be adjusted with respect to the phase of a given axis of the main working field. The field produced by the auxiliary winding 32 is of a nature to directly affect the balancing action of the motor, and said field may be adjusted in phase and in magnitude to obtain any desired balancing action within the operating limits of the particular piece of apparatus.

The operation of the motor shown in Fig. 4 will be obvious from the following explanation. The unbalanced polyphase condition obtaining in the main primary winding 31 results in the production of two oppositely rotating balanced polyphase fields, each of which rotates at synchronous speed. One field, which may be designated as the load-field and which is usually the larger of the two, rotates at synchronous speed in the direction of rotation of the rotor winding. Therefore, the relative rotation between the load-field and the rotor corresponds to slip frequency. The other field, which may be designated as the unbalancing-field and which is usually the smaller of the two, rotates at synchronous speed relative to the stator in a direction opposite to the rotation of the rotor. Therefore, with respect to the rotor, the unbalancing field rotates at double frequency minus slip frequency. This unbalancing-field induces currents in the rotor winding 33 of twice synchronous frequency minus the slip frequency.

The currents induced in the rotor winding by reason of the unbalancing-field tend to neutralize the unbalancing-field, but, because of the internal reactance of the machine, the leakage flux obtaining between the rotor and stator, and for other reasons, this cannot be completely effected. Therefore, currents of proper value, phase displacement and frequency are introduced into the rotor winding 33 in order to augment the currents induced therein so as to completely neutralize the unbalancing-field. To this end, the auxiliary primary winding 32 is provided to set up a backwardly rotating elliptical field, which, in turn, may be resolved into a small forwardly rotating balanced component, which tends to modify slightly the corresponding current drawn by the main winding 31 from the line, and a large backwardly rotating component, which may be adjusted in phase and magnitude so as to induce in the rotor winding 33 an electromotive force just sufficient to overcome the impedance drops resulting from the currents induced by the unbalancing field of the main primary winding.

The motor shown in Fig. 5 is, in its general aspects, similar to that shown in Fig. 4. A quarter-phase induction motor 29 is connected to derive energy from a quarter-phase unbalanced supply system 30 and said motor is provided with a main primary winding 31 and with two auxiliary primary windings 32 and 32′. Said two auxiliary primary windings are disposed 90 electrical degrees from each other, as indicated, and certain adjacent corners thereof are connected together through auto-transformers 38—38. The main primary winding 31 is so connected to the polyphase supply system that its rotating field revolves in, for example, a clockwise direction and, in like manner, the two auxiliary primary windings 32 and 32′ are so connected to the supply system 30 that their rotating fields rotate in a counter clockwise direction. Said auxiliary primary windings 32 and 32′ are connected to the supply system through conductors which are attached to adjustable points in the auto-transformer 38—38 whereby the shape, magnitude, and phase relation of the negatively rotating magnetic field, which determines the balancing effect of the motor 29, may be adjusted as desired.

While I have shown my invention in a plurality of forms it will be obvious to those skilled in the art that it is not so limited but is susceptible of various minor changes and modifications without departing from the spirit thereof and I desire, therefore, that only such limitations shall be placed thereupon as are imposed by the prior art or as fall within the scope of the appended claims.

I claim as my invention:

1. A dynamo-electric machine for use as a shunt phase balancer for a polyphase distribution system, including, in combination, a polyphase primary winding aggregate adapted to be connected across said distribution system and capable of producing a field which is distorted with respect to the electromotive-forces impressed on said aggregate, a secondary winding which rotates at approximately synchronous speed with respect to said primary winding aggregate, and means for varying the phase and magnitude of said flux distortion, whereby the admittance of said machine to balanced currents of inverse phase sequence may be increased.

2. The combination with a polyphase distribution line, of a dynamo-electric machine having a primary winding aggregate connected across said line, and a secondary member rotating at substantially synchronous speed with respect to said primary aggregate, said polyphase line being unbalanced, thereby tending to set up an elliptical field in said primary winding aggregate, said primary winding aggregate being arranged to further distort said field, and means for varying the phase and magnitude of the distorting effects of said primary aggregate, whereby the admittance of said machine to balanced currents of inverse phase sequence may be increased.

3. The combination with a dynamo-electric machine provided with a primary member having two polyphase windings, of means for energizing one of said windings to produce a field rotating in one direction, means for energizing the other of said windings to produce a field rotating in the other direction, and means for adjusting the relative phase of said two fields.

4. The combination with a dynamo-electric machine provided with a primary member having two polyphase windings, of means for energizing one of said windings to produce a relatively strong field rotating in one direction, means for energizing the other of said windings to produce a relatively weak field rotating in the other direction, and means for adjusting the phase of said weak field relatively to said strong field.

5. The combination with an unbalanced polyphase system, of a polyphase dynamo-electric machine connected to operate therefrom, said dynamo-electric machine being provided with means for producing two polyphase primary fields of unequal magnitude and opposite phase-rotation, whereby the balancing effect of said machine upon said system is enhanced, and means for adjusting the relative phases of said two fields whereby the power-factor of said system may be adjusted.

6. The combination with a polyphase system subject to unbalance, of a polyphase dynamo-electric machine connected thereto, said machine embodying two primary windings so arranged and connected to said system as to provide two oppositely rotating magnetic fields of unequal magnitude, and means for exciting the backwardly rotating field so as to substantially correct the unbalance of said system.

7. The combination with a polyphase system subject to unbalance, of a polyphase dynamo-electric machine connected thereto, said machine embodying two primary windings so arranged and connected to said system as to provide two oppositely rotating magnetic fields of unequal magnitude, and adjustable impedance elements connected in circuit with one of said windings, whereby the phase-relation of said fields may be altered.

8. The method of operating a polyphase dynamo-electric machine connected to an unbalanced polyphase system and provided with means for producing therein a pair of magnetic fields rotating respectively forwardly and backwardly at synchronous speed with respect to the frequency of said system, which comprises adjusting the strength of said backwardly rotating magnetic field proportionally to the degree of unbalance of said system.

9. The combination with a dynamo-electric machine provided with a primary member having main and auxiliary polyphase windings, of means for energizing said main windings to produce a field rotating in one direction, means for energizing said auxiliary windings to produce a field rotating in the other direction, said auxiliary windings comprising two composite windings displaced with respect to each other, and means for varying the magnitude and phase of the currents in the respective composite windings.

10. The combination with a dynamo-electric machine provided with a primary member having two polyphase windings, of means for energizing one of said windings to produce a relatively strong field rotating in one direction, means for energizing the other of said windings to produce a relatively weak field rotating in the other direction, said last-mentioned winding comprising two composite windings displaced with respect to each other, and variable transformer means connecting the terminals of said composite windings, and adapted to be connected with the same source of supply as the first-mentioned windings.

11. An induction machine aggregate, comprising a pair of polyphase primary windings adapted to be connected respectively in forward and backward phase-sequence to a polyphase line, means for adjusting the relative strengths and phase relations of the useful flux produced by said primary windings, and secondary windings including a plurality of circuits each of which is subjected to the influence of the flux produced by both of said primary windings.

In testimony whereof I have hereunto subscribed my name this 3rd day of Aug. 1916.

CHARLES LE G. FORTESCUE.